Patented Sept. 1, 1942

2,294,845

UNITED STATES PATENT OFFICE 2,294,845

NEOPRENE COMPOSITION

George Monty Hamilton, London, England, assignor to Callender's Cable & Construction Company Limited, London, England, a British company No Drawing. Application June 15, 1939, Serial No. 279,314. In Great Britain July 5, 1938

1 Claim. (Cl. 260—27)

In compounding rubber-like material, known as Neoprene, it is generally regarded as essential or advantageous to add materials of several classes. These include:

1. Magnesium oxide and zinc oxide which have special functions in stabilising and vulcanising the compound.
2. Softeners and
3. Fillers.

In accordance with the invention a Neoprene compound with advantageous properties is produced by incorporating shellac in addition to the ingredients under the first heading. The shellac may perform the functions of the other two classes mentioned but ordinary filling materials may also be added. Shellac may be used in proportions varying from 2.5 to 50 parts by weight for each 100 parts by weight of Neoprene.

It is to be understood that the term shellac as used in the specification and claim includes resins obtained by fractioning shellac and representing different degrees of refinement of the original material.

Incorporation of the shellac may be carried out as follows: Magnesium oxide is first added to Neoprene in the usual way. The shellac is then added. For this purpose further heat is applied generally by heating up the rolls on which the mixing takes place. The shellac flakes are readily adsorbed by the mixture and the shellac is well dispersed therein. This addition makes the mix very sticky. After the shellac has been incorporated the mix is preferably allowed to cool before the zinc oxide and any other ingredients are added.

The addition of shellac produces a mix which is easily worked without addition of other fillers although these may be used if required. The mix has numerous advantageous properties both during manufacture and after manufacture has been completed. The vulcanised product has good physical properties particularly those interesting for electrical insulation. The mix has properties which render it particularly suitable for the preparation of cellular Neoprene, that is Neoprene which has been expanded by providing within it a large number of small bodies of gas and permitting or causing these to expand.

An example of a mix which has good electrical properties is as follows, the proportions being by weight:

| | |
|---|---|
| Neoprene | 200 |
| Shellac | 50 |
| Magnesium oxide | 10 |
| Talc | 150 |
| Zinc oxide | 3 |

This mix, after vulcanisation, has a specific insulation resistance of about $10^{12}$ ohms at 20° C. which is from 100 to 1,000 times the value obtained with Neoprene mixes at present in use.

The following mix is suitable for the production of cellular Neoprene, the proportions being by weight:

| | |
|---|---|
| Neoprene | 200 |
| Shellac | 20 |
| Magnesium oxide | 10 |
| Zinc oxide | 3 |

In producing cellular Neoprene the avoidance of the necessity for incorporating inert fillers gives the possibility of an important improvement in the product, since such inert fillers will not dissolve the gas and therefore must have the effect of reducing the proportion of gas space to solid material in the final product. Since it is in general the object in producing cellular Neoprene to make the proportion of gas space to solid material as high as possible while keeping the necessary mechanical strength it will be seen that the possibility of getting a workable mix without inert fillers is an important advance.

What I claim as my invention is:

In a process of production of a cellular rubber-like material involving compounding followed by expanding and vulcanizing, the steps of compounding which comprise mechanically mixing magnesium oxide and polymerized chloro-2-butadiene, heating the mix and adding dry shellac within the limits of 2.5 to 50 parts by weight to each 100 parts by weight of polymerized chloro-2-butadiene, cooling the mix and adding zinc oxide.

GEORGE MONTY HAMILTON.